(12) United States Patent
Salvi et al.

(10) Patent No.: US 11,772,465 B2
(45) Date of Patent: Oct. 3, 2023

(54) VEHICLE SUNSHADE WITH VARIABLE WIDTH

(71) Applicant: GM GLOBAL TECHNOLOGY OPERATIONS LLC, Detroit, MI (US)

(72) Inventors: Daniel Lopez de Salvi, Burbank, CA (US); Keith E. Diven, Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/589,914

(22) Filed: Feb. 1, 2022

(65) Prior Publication Data

US 2023/0241950 A1   Aug. 3, 2023

(51) Int. Cl.
  *B60J 7/00*   (2006.01)
  *B60J 7/043*  (2006.01)
  *E06B 9/40*   (2006.01)

(52) U.S. Cl.
  CPC .............. *B60J 7/0015* (2013.01); *B60J 7/043* (2013.01); *E06B 9/40* (2013.01)

(58) Field of Classification Search
  CPC . B60J 7/0015; B60J 7/043; B60J 7/067; B60J 7/068; B60J 1/2052; E06B 9/40
  USPC ........ 296/97.8, 214, 216.01, 216.02, 216.03, 296/216.04, 216.05, 216.08; 160/84.01, 160/84.02, 84.03, 84.04, 8.06, 370.23
  See application file for complete search history.

(56) References Cited

U.S. PATENT DOCUMENTS

| | | | | |
|---|---|---|---|---|
| 6,848,493 B1* | 2/2005 | Hansen | ................... | B60J 1/2044 160/265 |
| 8,210,228 B2* | 7/2012 | Kirby | ..................... | A47H 23/04 160/310 |
| 2016/0009165 A1* | 1/2016 | Sawada | .................. | B60J 7/0015 296/98 |
| 2019/0054807 A1* | 2/2019 | Hiramatsu | ............... | B60J 7/043 |

FOREIGN PATENT DOCUMENTS

CN   111703282 A  *  9/2020   .............. B60J 1/203

OTHER PUBLICATIONS

Che et al., "Telescopic sun-shading device for automobile compartment", Published Sep. 25, 2020, Publisher: Chinese Patent Office/European Patent Office, Edition: CN111703282A (Year: 2020).*

* cited by examiner

*Primary Examiner* — Dennis H Pedder
*Assistant Examiner* — Joyce Eileen Hill
(74) *Attorney, Agent, or Firm* — CANTOR COLBURN LLP

(57) ABSTRACT

A sunshade system of vehicle roof includes a sunshade formed from a fabric material including a plurality of pleats arranged across a lateral sunshade width and extending along a sunshade length. At least one sunshade guide extends along a length of the sunshade and retains a lateral width edge of the fabric material, and guides the sunshade along a path between a stowed position and an extended position. The sunshade has a variable sunshade width along the sunshade length in the extended position by expansion and relaxation of the plurality of pleats.

20 Claims, 5 Drawing Sheets

VEHICLE SUNSHADE WITH VARIABLE WIDTH

INTRODUCTION

The subject disclosure relates to vehicles having glass roofs, and in particular to sunshade systems for vehicles with glass roofs.

Typical sunshades for vehicles extend to a rectangular shape to cover a selected glass area. In the design of vehicles with glass roofs, it is desired to increase the glass area of the roof as much as possible to enhance the customer experience. To accomplish this, the glass panel may vary in width across the body of the vehicle from forward to aft of the glass panel. Using a typical sunshade would result in a sunshade that leaves portions of the glass panel uncovered, thus reducing the effectiveness of the sunshade.

SUMMARY

In one embodiment, a sunshade system of vehicle roof includes a sunshade formed from a fabric material including a plurality of pleats arranged across a lateral sunshade width and extending along a sunshade length. At least one sunshade guide extends along a length of the sunshade and retains a lateral width edge of the fabric material, and guides the sunshade along a path between a stowed position and an extended position. The sunshade has a variable sunshade width along the sunshade length in the extended position by expansion and relaxation of the plurality of pleats.

Additionally or alternatively, in this or other embodiments the sunshade is located in a sunshade housing when in the stowed position.

Additionally or alternatively, in this or other embodiments the sunshade is wrapped around a roller mechanism when the sunshade is in the stowed position.

Additionally or alternatively, in this or other embodiments the at least one sunshade guide is two sunshade guides. A sunshine guide of the two sunshine guides is located at each lateral width edge of the fabric material.

Additionally or alternatively, in this or other embodiments the at least one sunshade guide includes a first recess into which the lateral width edge is inserted.

Additionally or alternatively, in this or other embodiments the at least one sunshade guide includes a second recess opposite the first recess into which a retaining tab of the sunshade is inserted.

Additionally or alternatively, in this or other embodiments the sunshade is trapezoidal in shape when in the extended.

In another embodiment, a roof and sunshade assembly of a vehicle includes a roof assembly including an at least semi-transparent roof panel and a sunshade system to selectably block the roof panel. The sunshade system includes a sunshade formed from a fabric material including a plurality of pleats arranged across a lateral sunshade width and extending along a sunshade length. At least one sunshade guide extends along a length of the sunshade and retains a lateral width edge of the fabric material, and guides the sunshade along a path between a stowed position and an extended position. The sunshade has a variable sunshade width along the sunshade length in the extended position by expansion and relaxation of the plurality of pleats.

Additionally or alternatively, in this or other embodiments the sunshade is located in a sunshade housing when in the stowed position.

Additionally or alternatively, in this or other embodiments the sunshade housing is attached to the roof assembly.

Additionally or alternatively, in this or other embodiments a roller mechanism is located in the sunshade housing, and the sunshade is wrapped around the roller mechanism when the sunshade is in the stowed position.

Additionally or alternatively, in this or other embodiments the at least one sunshade guide is two sunshade guides. A sunshine guide of the two sunshine guides is located at each lateral width edge of the fabric material.

Additionally or alternatively, in this or other embodiments the at least one sunshade guide includes a first recess into which the lateral width edge is inserted.

Additionally or alternatively, in this or other embodiments the at least one sunshade guide includes a second recess opposite the first recess into which a retaining tab of the sunshade is inserted.

Additionally or alternatively, in this or other embodiments the roof panel is formed from one of glass or a polymer material.

Additionally or alternatively, in this or other embodiments the roof panel has a first panel width at a rearward end of the roof panel and a second panel width greater than the first panel width at a forward end of the roof panel, opposite the rearward end.

Additionally or alternatively, in this or other embodiments the sunshade has a first sunshade width at the rearward end of the roof panel and a second sunshade width greater than the first sunshade width at the forward end of the roof panel when the sunshade is in the extended position.

In yet another embodiment, a roof and sunshade assembly of a vehicle includes a roof assembly including an at least semi-transparent roof panel extending from a forward end of the roof panel to a rearward end of the roof panel, opposite the forward end. A sunshade system selectably blocks the roof panel. The sunshade system includes a sunshade formed from a fabric material including a plurality of pleats arranged across a lateral sunshade width and extending along a sunshade length. At least one sunshade guide extends along a length of the sunshade and retaining a lateral width edge of the fabric material and guides the sunshade along a path between a stowed position and an extended position. The sunshade has a variable sunshade width along the sunshade length in the extended position by expansion and relaxation of the plurality of pleats. The sunshade is disposed in a sunshade housing located at the rearward end of the roof panel when in the stowed position.

Additionally or alternatively, in this or other embodiments the at least one sunshade guide includes a first recess into which the lateral width edge is inserted.

Additionally or alternatively, in this or other embodiments the at least one sunshade guide includes a second recess opposite the first recess into which a retaining tab of the sunshade is inserted.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
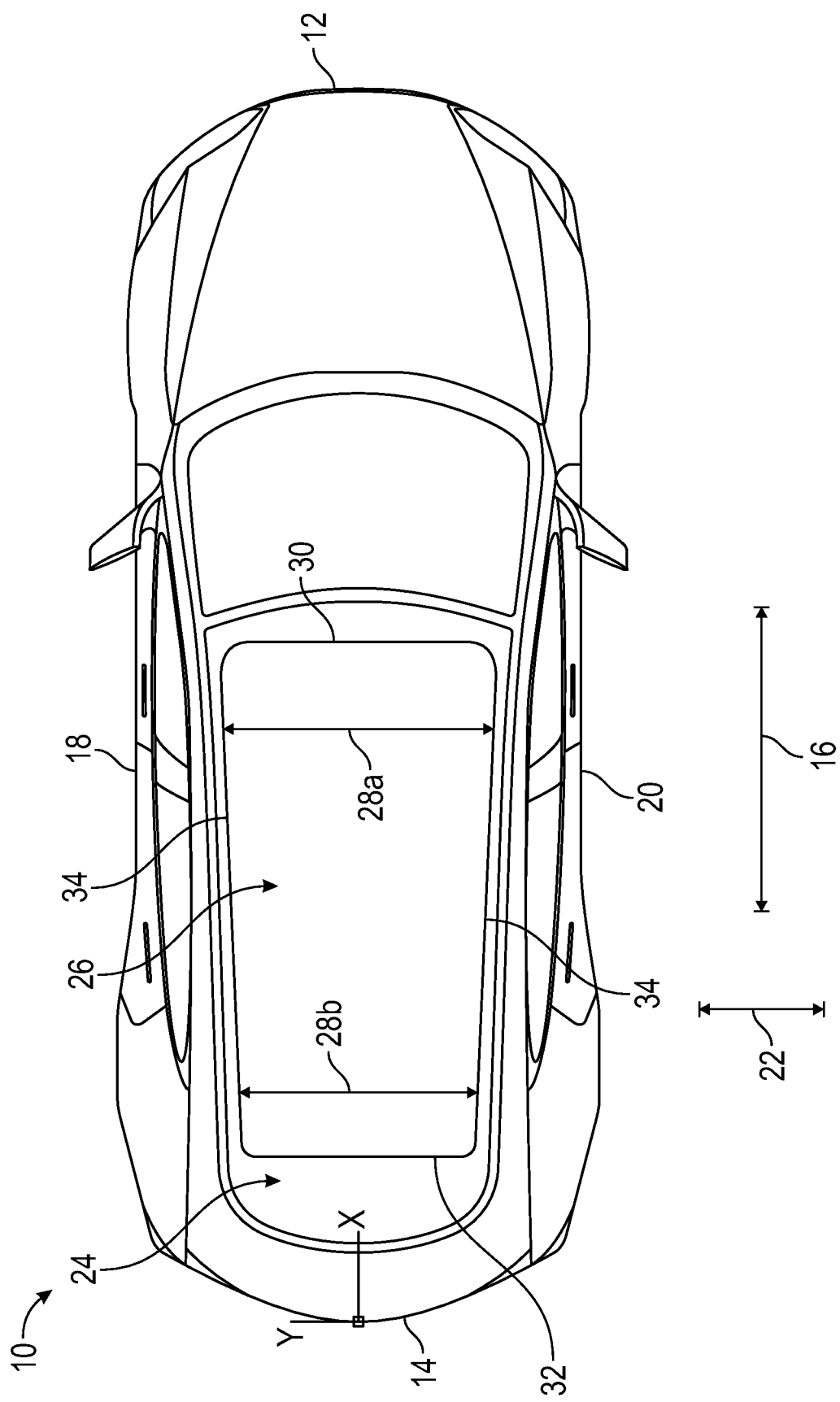
FIG. 1 is a plan view of an embodiment of a vehicle with an at least semi-transparent roof panel.

The following description is merely exemplary in nature and is not intended to limit the present disclosure, its application or uses. It should be understood that throughout the drawings, corresponding reference numerals indicate like or corresponding parts and features.

In accordance with an exemplary embodiment, a plan view of an embodiment of a vehicle 10 is illustrated in FIG. 1. The vehicle 10 extends from a front end 12 to a rear end 14 along a vehicle length direction 16 and from a first side 18 to a second side 20 along a vehicle width direction 22. The vehicle 10 includes a roof 24 at least partially defining a top of the vehicle 10. The roof 24 includes a glass roof panel 26, which defines at least a portion of the roof 24. Although the roof panel 26 is referred to as a glass roof panel 26 in this description and in the drawings, one skilled in the art will readily appreciate that may be formed from other translucent or transparent materials, such as polymer materials. In some embodiments, the roof panel 26 is stationary or fixed, while in other embodiments the roof panel 26 is movable. The roof panel 26 varies in panel width 28 in the vehicle width direction 22 at different locations along the vehicle length direction 16. For example, as shown in FIG. 1, the roof panel 26 has a first panel width 28*a* at a first panel end 30 and a second panel width 28*b* less than the first panel width 28*a* at a second panel end 32. In some embodiments, the first panel end 30 is the panel end closest to the front end 12, while the second panel end 32 is the panel end closest to the rear end 14. In these embodiments, the roof panel 26 is defined as a substantially trapezoidal shape, such that linear panel sides 34 extend between the first panel end 30 and the second panel end 32. It is to be appreciated, however, that the trapezoidal configuration described herein is merely exemplary, and that the roof panel 24 may be of another suitable shape.

Figure 2A:
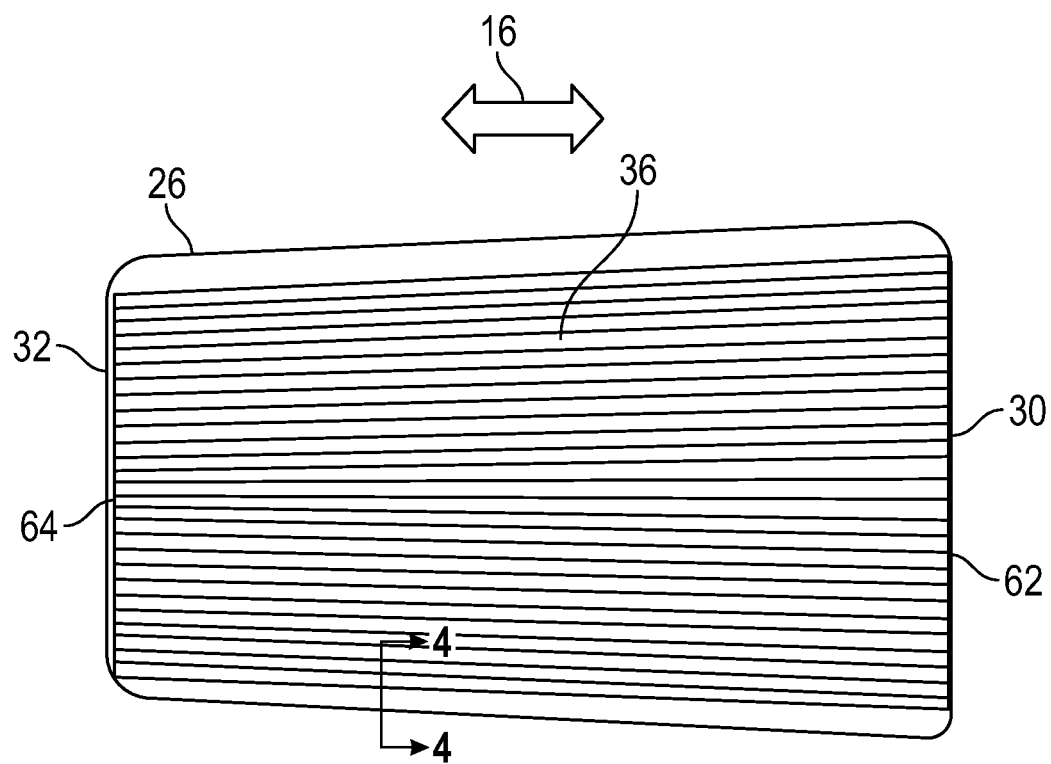
FIG. 2A is a plan view looking upward of an embodiment of a sunshade in an extended position covering a roof panel.
Figure 2B:
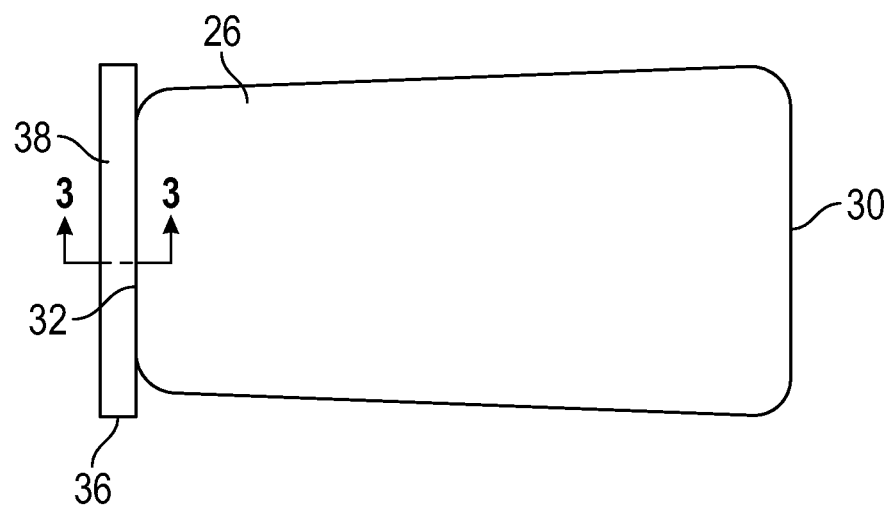
FIG. 2B is a plan view of an embodiment of a sunshade in a stowed position in a sunshade housing.
Figure 3:
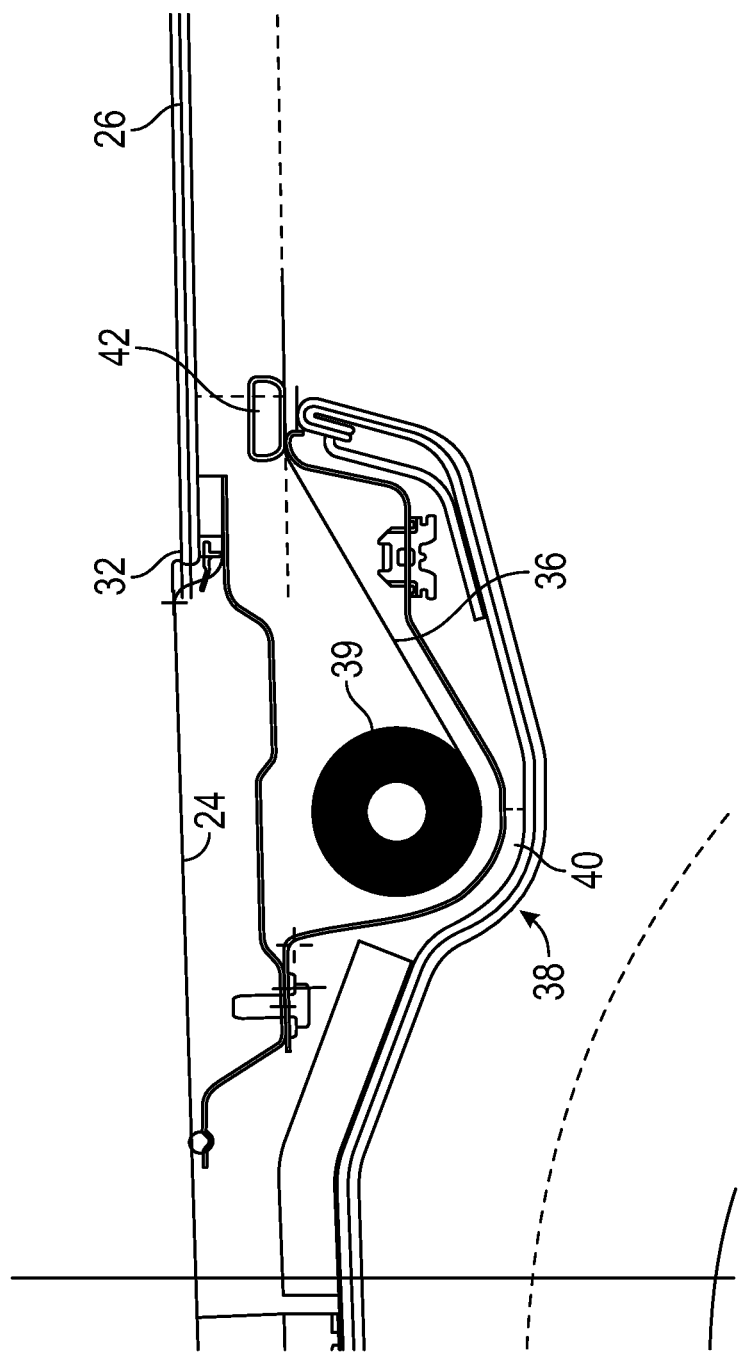
FIG. 3. is a side cross-sectional view of an embodiment of a sunshade stowed a sunshade housing.

Referring now to FIGS. 2A and 2B, the vehicle 10 includes a sunshade 36 that, when in an extended position as shown in FIG. 2A, at least partially covers the roof panel 26 to block light entering the vehicle 10 through the roof panel 26. The sunshade 36 is located in an interior of the vehicle 10, and is movable between a stowed position, as shown in FIG. 2B and the extended position as shown in FIG. 2A. In some embodiments, the sunshade 36 is driven between the stowed position and the extended position by, for example, an electric motor or actuator (not shown) operably connected to the sunshade 36. Alternatively the sunshade 36 may be moved manually by a user. The sunshade 36 is formed from a fabric material and when in the extended position, the sunshade 36 is trapezoidal in shape. When in the stowed position, the sunshade 36 is stored at a roller mechanism 38 located at, for example, the second panel end 32. An exemplary embodiment of a roller mechanism 38 is illustrated in the cross-sectional view of FIG. 3. The sunshade 36 and a roller 39 are disposed in a housing 40, which in some embodiments is secured to the roof 24. The roller mechanism 38 extends across the vehicle 10 in the vehicle width direction 22 and the sunshade 36 is wrapped around the roller 39. The sunshade 36 is fed through a housing guide 42 of the housing 40, which in some embodiments is a slot formed in the housing 40.

Figure 4:
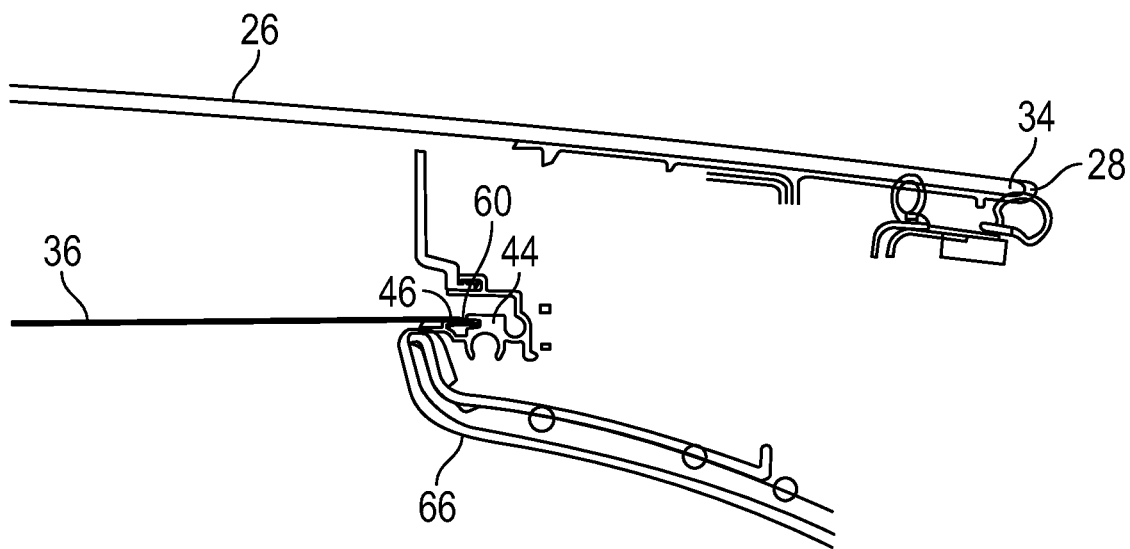
FIG. 4 is a width-wise cross-sectional view of an embodiment of a sunshade and a guide rail.
Figure 5:
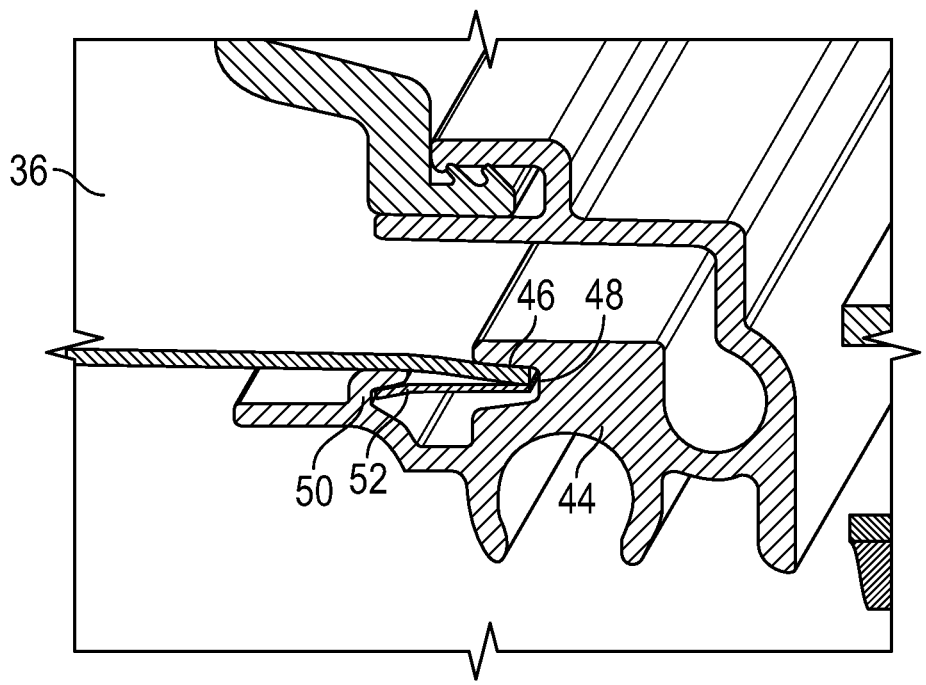
FIG. 5 is the same width-wise cross-sectional view from FIG. 4 focused on the guide rail.

Referring now to FIG. 4, guide rails 44 are located at opposing sides of the roof panel 26 and extend along each of the panel sides 34. In some embodiments, the guide rails 44 each extend parallel to the respective panel side 34. The sunshade 36 is attached to each of the guide rails 44 so that the guide rails 44 retain and guide a sunshade lateral edge 46 when the sunshade 36 is moved between the stowed position, shown in FIG. 2B and the extended position shown in FIG. 2A. An exemplary attachment is illustrated in FIG. 5. The guide rail 44 includes a first recess 48 into which the lateral edge 46 is installed, and a second recess 50 opposite the first recess 48, into which a retaining tab 52 of the sunshade 36 is inserted. The retaining tab 52 prevents the lateral edge 46 from being removed from the first recess 48.

Figure 6:
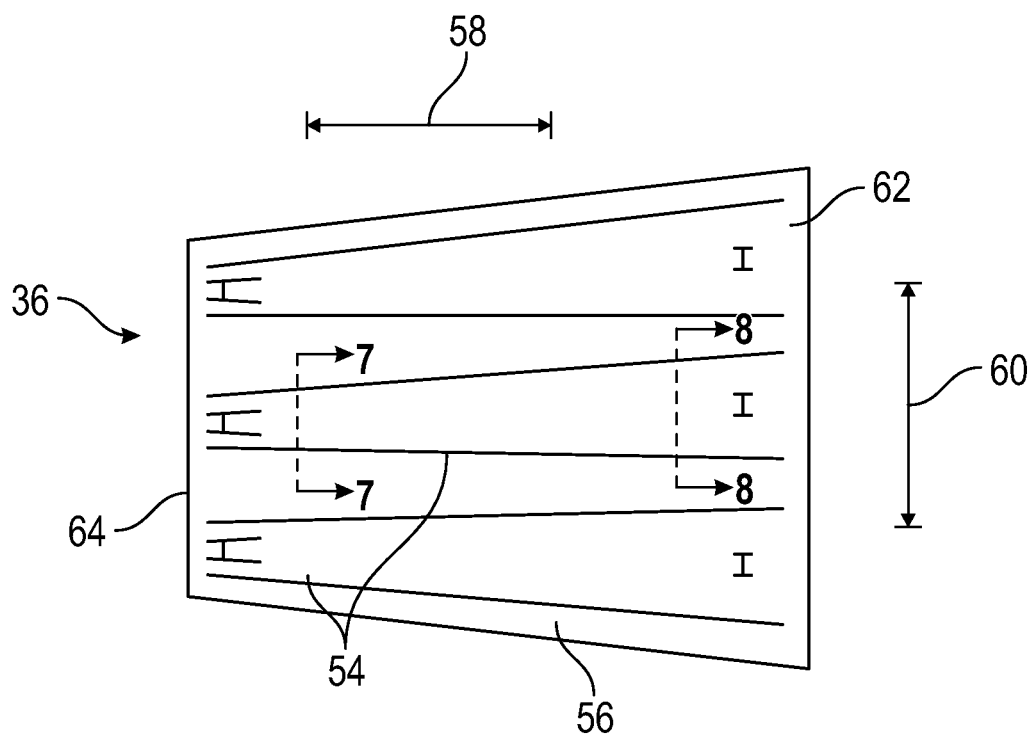
FIG. 6 is a plan view of an embodiment of a sunshade illustrating a plurality of pleats in the sunshade.
Figure 7:
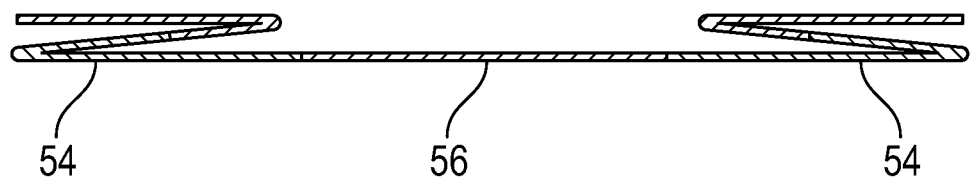
FIG. 7 is a cross-sectional view of an embodiment of a pleat in a relaxed position.
Figure 8:
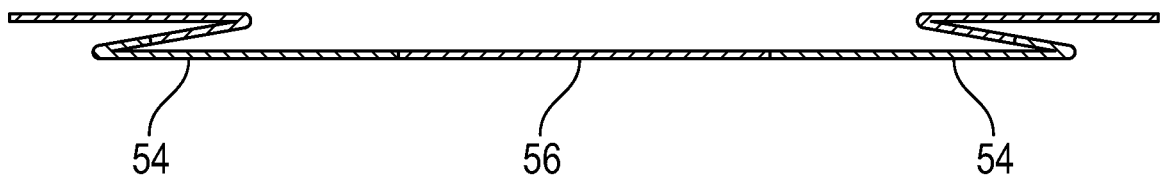
FIG. 8 is a cross-sectional view of an embodiment of a pleat in an extended position.

Referring to FIGS. 6, 7 and 8, the sunshade 36 is formed with a plurality of pleats 54 in the sunshade fabric material 56. The pleats 54 extend along a sunshade length 58 and allow for an increase in a sunshade width 60 at a first sunshade end 62, relative to a second sunshade end 64, thus enabling the sunshade 36 to vary in sunshade width 60 along its length to define, for example, a trapezoidal shape as illustrated in FIG. 6. More particularly, as shown in the exemplary pleat 54 of FIGS. 7 and 8, when the sunshade is in the extended position, the pleat 54 has a relatively closed or relaxed shape at or near or closer to the second sunshade end 64 as shown in FIG. 7. Referring now to FIG. 8, as the sunshade 36 extends from the second sunshade end 64 to the first sunshade end 62, the pleat 54 expands, as guided by the guide rails 44 (shown in FIG. 5). When the sunshade 36 is moved from the extended position to the stowed position, guided by the guide rail 44, the pleats 54 return to their relaxed or closed configuration, thereby reducing the sunshade width 60. The pleats 54 are formed in the fabric material 56 by placing the fabric material 56 in a mold and folding or rolling the mold tight into the desired pleat 54 shape. The mold containing the fabric material 56 is then placed under heat and pressure in, for example, a steam cabinet. The resulting pleat 54 is a permanent fold in the fabric material 56. The polymer chain of the fabric material 56 is altered at the pleat 54 by the forming process, becoming more aligned and rigid. The new bonds that form in the pleat 54 make the shape permanent so as the fabric material 56 is opened and relaxed it will return to the pleated shape.

Referring again to FIG. 4, in some embodiments, the vehicle 10 includes an interior trim element 66 that covers the guide rails 44 and overlaps a portion of the roof panel 26, such that the sunshade width 60 is less than the panel width 28.

The sunshade 36 disclosed herein having variable sunshade width 60 along the sunshade length 58 allows for varying the shape of the roof panel 26, while still being able to maximize coverage of the roof panel 26 by the sunshade 26.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A sunshade system of a vehicle roof, comprising:
   a sunshade formed from a fabric material including a plurality of pleats arranged across a lateral sunshade width and extending along a sunshade length; and
   at least one sunshade guide extending along a length of the sunshade and retaining a lateral width edge of the fabric material and guiding the sunshade along a path between a stowed position and an extended position;
   wherein the sunshade has a variable sunshade width along the sunshade length in the extended position by expansion and relaxation of the plurality of pleats;
   wherein at least one pleat disposed at a laterally center portion of the fabric material includes at least two opposing folds in the fabric material, a first fold of the at least two folds extending non-parallel to a second fold of the at least two folds.

2. The sunshade system of claim 1, further comprising a sunshade housing in which the sunshade is disposed when in the stowed position.

3. The sunshade system of claim 1, further comprising a roller around which the sunshade is wrapped when the sunshade is in the stowed position.

4. The sunshade system of claim 1, wherein the at least one sunshade guide is two sunshade guides, a sunshine guide of the two sunshade guides located at each lateral width edge of the fabric material.

5. The sunshade system of claim 1, wherein the at least one sunshade guide includes a first recess into which the lateral width edge is inserted.

6. The sunshade system of claim 5, wherein the at least one sunshade guide includes a second recess opposite the first recess into which a retaining tab of the sunshade is inserted.

7. The sunshade system of claim 1, wherein in the extended position the sunshade is trapezoidal in shape.

8. A roof and sunshade assembly of a vehicle, comprising:
   a roof assembly including an at least semi-transparent roof panel; and
   a sunshade system to selectably block the roof panel, the sunshade system including:
   a sunshade formed from a fabric material including a plurality of pleats arranged across a lateral sunshade width and extending along a sunshade length; and
   at least one sunshade guide extending along a length of the sunshade and retaining a lateral width edge of the fabric material and guiding the sunshade along a path between a stowed position and an extended position;
   wherein the sunshade has a variable sunshade width along the sunshade length in the extended position by expansion and relaxation of the plurality of pleats;
   wherein at least one pleat disposed at a laterally center portion of the fabric material includes at least two opposing folds in the fabric material, a first fold of the at least two folds extending non-parallel to a second fold of the at least two folds.

9. The roof and sunshade assembly of claim 8, further comprising a sunshade housing in which the sunshade is disposed when in the stowed position.

10. The roof and sunshade assembly of claim 9, wherein the sunshade housing is attached to the roof assembly.

11. The roof and sunshade assembly of claim 9, further comprising a roller disposed in the sunshade housing around which the sunshade is wrapped when the sunshade is in the stowed position.

12. The roof and sunshade assembly of claim 8, wherein the at least one sunshade guide is two sunshade guides, a sunshine guide of the two sunshine guides located at each lateral width edge of the fabric material.

13. The roof and sunshade assembly of claim 8, wherein the at least one sunshade guide includes a first recess into which the lateral width edge is inserted.

14. The roof and sunshade assembly of claim 13, wherein the at least one sunshade guide includes a second recess opposite the first recess into which a retaining tab of the sunshade is inserted.

15. The roof and sunshade assembly of claim 8, wherein the roof panel is formed from one of glass or a polymer material.

16. The roof and sunshade assembly or claim 8, wherein the roof panel has a first panel width at a forward end of the roof panel and a second panel width at a rearward end of the roof panel, opposite the rearward end, the first panel width greater than the second panel width.

17. The roof and sunshade assembly of claim 16, wherein in the extended position the sunshade has a first sunshade width at the rearward end of the roof panel and a second sunshade width greater than the first sunshade width at the forward end of the roof panel.

18. A roof and sunshade assembly of a vehicle, comprising:
   a roof assembly including an at least semi-transparent roof panel extending from a forward end of the roof panel to a rearward end of the roof panel, opposite the forward end; and
   a sunshade system to selectably block the roof panel, the sunshade system including:
   a sunshade formed from a fabric material including a plurality of pleats arranged across a lateral sunshade width and extending along a sunshade length; and
   at least one sunshade guide extending along a length of the sunshade and retaining a lateral width edge of the fabric material and guiding the sunshade along a path between a stowed position and an extended position;
   wherein the sunshade has a variable sunshade width along the sunshade length in the extended position by expansion and relaxation of the plurality of pleats;
   wherein when in the stowed position the sunshade is disposed in a sunshade housing located at the rearward end of the roof panel;
   wherein at least one pleat disposed at a laterally center portion of the fabric material includes at least two opposing folds in the fabric material, a first fold of the at least two folds extending non-parallel to a second fold of the at least two folds.

19. The roof and sunshade assembly of claim 18, wherein the at least one sunshade guide includes a first recess into which the lateral width edge is inserted.

20. The roof and sunshade assembly of claim 19, wherein the at least one sunshade guide includes a second recess opposite the first recess into which a retaining tab of the sunshade is inserted.

* * * * *